Jan. 16, 1962  E. R. ZIEGLER  3,016,836
WINDSHIELD WASHER CONTROL SYSTEM
Filed Nov. 18, 1957
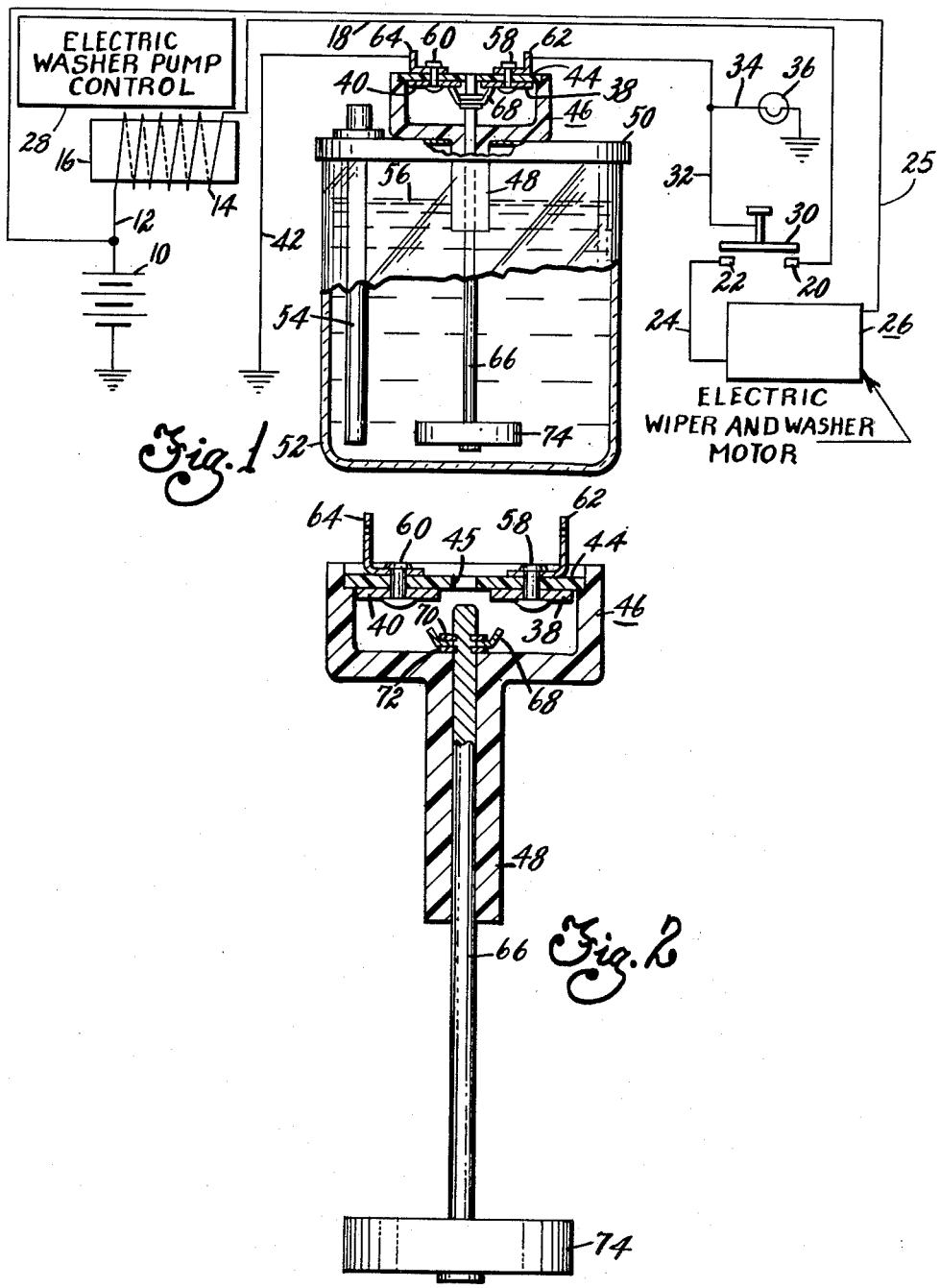
INVENTOR.
EUGENE R. ZIEGLER
BY
*A. H. Strickland*
HIS ATTORNEY

United States Patent Office 3,016,836
Patented Jan. 16, 1962

---

3,016,836
WINDSHIELD WASHER CONTROL SYSTEM
Eugene R. Ziegler, Spencerport, N.Y., assignor to General Motors Corporation, Detroit, Mich., a corporation of Delaware
Filed Nov. 18, 1957, Ser. No. 697,084
2 Claims. (Cl. 103—26)

This invention pertains to the art of windshield cleaning, and particularly to an improved control system for windshield washers.

Heretofore, it has been proposed to coordinate operation of a windshield wiper unit with the operation of a washer unit. Examples of coordinated mechanisms of this type are shown in my copending application, Serial No. 634,867 filed January 18, 1957, now Patent No. 2,878,505, Serial No. 674,495 filed July 26, 1957 in the name of Schmitz et al. and Serial No. 686,432 filed Sept. 26, 1957, now Patent No. 2,977,623, in the name of Harry W. Schmitz. Coordinated washer wiper mechanisms constructed according to the aforementioned applications or other units commercially available operate satisfactorily when the solvent reservoir contains liquid solvent. However, if the solvent reservoir is depleted of solvent, upon initiating coordinated operation, the wiper unit will start without the discharge of solvent onto the windshield. This is undesirable since the movement of the wiper blade over a dry, dirty windshield may cause scratching of the glass and rapid deterioration of the windshield wiper blades. The present invention relates to a control system for a washer unit which will prevent automatic operation of the wiper unit if the liquid solvent reservoir is empty, and moreover will actuate a visual indicator to apprize the vehicle operator that the solvent reservoir is empty.

Accordingly, among my objects are the provision of a washer unit including means for indicating if the liquid solvent in the reservoir is depleted upon manual closure of the washer control; the further provision of a coordinated wiper unit-washer unit control system including means for precluding operation of the wiper unit when the solvent reservoir is empty; the further provision of an electrically controlled washer unit including means for preventing operation of the washer unit when the liquid solvent reservoir is empty; and the still further provision of an electrically controlled washer unit including unique liquid level actuated switch means in the solvent reservoir.

The aforementioned and other objects are accomplished in the present invention by incorporating a float operated switch in the solvent reservoir. Moreover, while the control system disclosed herein is particularly applicable to wiper unit-washer unit systems which are electrically controlled and electrically operated, it is to be understood that the control system can be used with other types of wiper units and washer units, and thus, the specific reference to electrically controlled, or electrically operated units, is only exemplary.

Specifically, the solvent reservoir comprises a jar having a cover attached thereto. The cover has a switch housing mounted thereon including a pair of spaced contacts which can be interconnected by a bridging contact. In the instant embodiment, the bridging contact comprises a nonferrous lock washer which is loosely attached to a rod. The rod is guided for reciprocable movement and has a liquid level responsive member, or float, attached to its lower end. Whenever the level of liquid solvent in the reservoir is sufficiently above the open end of the intake conduit to supply sufficient water for a complete wash cycle, the float will maintain the bridging member in a position so that the contacts are interconnected. However, upon depletion of solvent in the reservoir, the float will fall by gravity so as to interrupt the connection between the two contacts.

The circuit for the washer unit includes a manually operable push button, such that when the push button is momentarily closed the energizing circuit for the washer unit and the wiper unit will be completed if the float operated switch is closed. However, when there is insufficient fluid in the reservoir to maintain the float operated switch closed, manual closure of the coordinated washer-wiper switch will not complete the circuits to the electric wiper and washer motor and the electric washer pump control through the float operated switch. In addition, if desired an indicating lamp may be connected in the circuit to visually indicate to the vehicle operator that the solvent reservoir is empty.

Further objects and advantages of the present invention will be apparent from the following description, reference being had to the accompanying drawing, wherein a preferred embodiment of the present invention is clearly shown.

In the drawing:

FIGURE 1 is a combined schematic and diagrammatic view of the control system constructed according to this invention.

FIGURE 2 is a view, partly in section and partly in elevation, of the float operated switch mechanism.

With particular reference to FIGURE 1, a control system for an electrically operated washer unit and an electrically operated wiper unit is shown including a battery 10. One terminal of the battery is grounded and the other terminal is connected to a wire 12, the wire 12 being connected to one end of a relay coil 14. The relay coil 14 encircles a core 16. The other end of the coil 14 is connected to a wire 18 which is connected to a fixed contact 20.

The fixed contact 20 is separated from a second fixed contact 22, the contact 22 being connected to a wire 24, the wire 24 being connected with a control unit for an electric wiper and washer motor generally depicted by the numeral 26. The battery 10 is connected to the electric wiper and washer motor 26 by wire 25, the motor 26 having a relay operated switch similar to that depicted at 14 and 16, all as shown in the aforementioned application Serial No. 686,432. The relay coil 14 and the core 16 control an electric washer pump control indicated by numeral 28.

The contacts 20 and 22 can be interconnected by a bridging contact 30 which is of the manually operable push button type. The bridging contact 30 is connected with a wire 32. The wire 32 is connected to a wire 34 having an electric lamp 36 connected therewith, the other terminal of the electric lamp being grounded. The wire 32 is also connected to a stationary contact 38 which is spaced from a second stationary contact 40. The contact 40 is connected to a wire 42 which is grounded.

Referring particularly to FIGURES 1 and 2, the contacts 38 and 40 comprise metallic washers disposed on one side of an insulating plate 44 having a central aperture 45. The insulating plate 44 is supported by a housing 46 of insulating material, the housing 46 having an integral sleeve 48 depending downwardly therefrom. The housing 46 is adapted for connection to a cover 50 of a liquid solvent reservoir, or jar 52. The cover 50 has an intake conduit, or pipe 54, extending therein, the conduit likewise being attached to the cover. As shown in FIGURE 1, the jar 52 contains liquid solvent indicated by numeral 56.

The contacts 38 and 40 are connected by rivets 58 and 60 respectively, to terminal lugs 62 and 64 respectively. The hollow sleeve 48 slidably supports a rod, or element 66 having a metallic lock washer 68 attached to its upper end between a pair of snap rings 70 and 72. The lock washer 68 has an upturned flanged edge, as indicated, constituting a bridging contact for interconnecting contacts 38 and 40. A liquid level responsive member, or float, 74 is suitably secured to the lower end of the rod 66.

When the jar 52 contains liquid solvent, the level of which is above the open end of the intake conduit 54, the float 74 will be buoyed upwardly to maintain the lock washer 68 in engagement with contacts 38 and 40. However, upon depletion of the level of liquid in the reservoir jar 52, below the bottom of the intake conduit 54, the float 74 will move downwardly to break the connection between contacts 38 and 40.

When the contacts 38 and 40 are interconnected by the lock washer 68, the push button bridging contact 30, or manually operable contact means, will be grounded. Moreover, at this time both terminals of the lamp 36 will be grounded so that upon momentary closure of the push button switch 30 to bridge contacts 20 and 22, the lamp 36 will not be energized. However, the relay coil 14 will be energized, and in accordance with the teachings of any of the aforementioned copending applications, an automatic cleaning cycle will be initiated since the washer pump unit and the wiper unit will be conjointly energized.

However, when the liquid solvent in jar 52 is depleted, or is below the level at which the float 74 will maintain the lock washer 68 in engagement with the contacts 38 and 40, the manually operable push button 30 will no longer be connected to ground. Therefore, upon momentary closure of the push button 30 the lamp 36 will be connected to the battery 10 through the coil 14. Accordingly, the lamp will be energized, and since the lamp can be mounted on the vehicle dashboard, not shown, it will visually indicate to the vehicle operator that the supply of liquid solvent is depleted.

Moreover, when the lamp 36 is connected in the circuit with the battery 10 through the coil 14, the coil 14 is insufficiently energized to actuate the washer pump control, and likewise the electric motor for operating the washer and wiper will not be sufficiently energized to actuate the motor. Hence, when the solvent reservoir is empty, or sufficiently depleted of liquid, so that the contacts 38 and 40 are not bridged by the lock washer 68, neither the washer unit nor the wiper unit will be energized. The lamp 36 need not be connected in the circuit to prevent operation of the washer unit and the wiper unit when the liquid solvent is depleted, but, merely is connected in the circuit when desired, to apprize the vehicle operator as to the reason why the cleaning mechanism will not operate on an automatically coordinated washing-wiping cycle.

From the foregoing it is apparent that the present invention provides a unique arrangement for preventing conjoint operation of a washer unit and a wiper unit if the supply of liquid solvent is depleted. In addition, the control system can embody visual means for apprizing the vehicle operator that the liquid solvent reservoir is empty.

While the embodiment of the invention as herein disclosed constitutes a preferred form, it is to be understood that other forms might be adopted.

What is claimed is as follows:

1. In combination, a reservoir adapted to contain a supply of liquid solvent, an electrically operable pump adapted to draw liquid solvent from said reservoir and deliver said liquid solvent under pressure, circuit means for energizing said pump including a source of electric power, a pump control relay coil connected to one terminal of said power source and a pair of switches connected in series between said coil and the other terminal of said power source, manual means controlling the operation of one of said switches, liquid level responsive means disposed within said reservoir controlling the operation of the other switch whereby energization of said pump control relay coil is precluded when the supply of liquid solvent in said reservoir is depleted, and a lamp shunting the switch controlled by the liquid level responsive means whereby manual actuation of said one switch when the other switch is open by reason of the supply of liquid solvent being depleted will energize said lamp and manual closure of said one switch when said other switch is closed due to the presence of liquid solvent in said reservoir will energize said pump control relay coil and short circuit said lamp.

2. In combination, a reservoir adapted to contain a supply of liquid solvent, an electrically operable pump adapted to draw liquid solvent from said reservoir and deliver said liquid solvent under pressure, circuit means for energizing said pump including a source of electric power, a pump control relay coil connected to one terminal of said power source and a pair of switches connected in series between said coil and the other terminal of said power source, manual means controlling the operation of one of said switches, liquid level responsive means disposed within said reservoir controlling the operation of the other switch whereby energization of said pump control relay coil is precluded when the supply of liquid solvent in said reservoir is depleted, and electrically actuated indicating means shunting the switch controlled by the liquid level responsive means whereby manual actuation of said one switch when the other switch is open by reason of the supply of liquid solvent being depleted will energize said indicating means and manual closure of said one switch when said other switch is closed due to the presence of liquid solvent in said reservoir will energize said pump control relay coil and short circuit said indicating means.

References Cited in the file of this patent

UNITED STATES PATENTS

| | | |
|---|---|---|
| 980,214 | De Bisschop | Jan. 3, 1911 |
| 1,346,898 | Kingbury | July 20, 1920 |
| 1,358,741 | Hollis | Nov. 16, 1920 |
| 1,404,152 | Kettering | Jan. 17, 1922 |
| 2,407,215 | Anderson | Sept. 10, 1946 |
| 2,877,485 | Oishei | Mar. 17, 1959 |

FOREIGN PATENTS

| | | |
|---|---|---|
| 523,471 | Belgium | Oct. 31, 1953 |
| 733,640 | Great Britain | July 13, 1955 |
| 837,311 | France | Feb. 8, 1939 |